US009304622B2

(12) United States Patent
Badaye et al.

(10) Patent No.: US 9,304,622 B2
(45) Date of Patent: Apr. 5, 2016

(54) TOUCH ORIENTATION CALCULATION

(75) Inventors: Massoud Badaye, Sunnyvale, CA (US); Jonathan R. Peterson, Everett, WA (US); David P. Funston, Edmonds, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 358 days.

(21) Appl. No.: 13/538,122

(22) Filed: Jun. 29, 2012

(65) Prior Publication Data

US 2014/0002407 A1   Jan. 2, 2014

(51) Int. Cl.
G06F 3/044 (2006.01)
G06F 3/041 (2006.01)
G06F 3/0488 (2013.01)

(52) U.S. Cl.
CPC .......... G06F 3/0416 (2013.01); G06F 3/04883 (2013.01)

(58) Field of Classification Search
CPC ...................................................... G06F 3/044
USPC ................................ 345/173–183; 178/18.06
See application file for complete search history.

(56) References Cited

U.S. PATENT DOCUMENTS

| 6,888,536 | B2 * | 5/2005 | Westerman et al. .......... 345/173 |
| 7,374,490 | B2 | 5/2008 | Tahara et al. |
| 8,154,529 | B2 | 4/2012 | Sleeman et al. |
| 2002/0015024 | A1 * | 2/2002 | Westerman et al. .......... 345/173 |
| 2005/0259085 | A1 | 11/2005 | Baker et al. |
| 2006/0244735 | A1 * | 11/2006 | Wilson .......................... 345/173 |
| 2007/0097096 | A1 * | 5/2007 | Rosenberg .................... 345/173 |
| 2009/0207138 | A1 | 8/2009 | Thorn |
| 2010/0079405 | A1 * | 4/2010 | Bernstein ...................... 345/174 |
| 2010/0097328 | A1 | 4/2010 | Simmons et al. |
| 2010/0289754 | A1 * | 11/2010 | Sleeman et al. ............. 345/173 |
| 2011/0012010 | A1 * | 1/2011 | Major ........................ 250/201.1 |
| 2011/0037725 | A1 | 2/2011 | Pryor |
| 2011/0157096 | A1 * | 6/2011 | Drumm ......................... 345/175 |
| 2012/0026084 | A1 * | 2/2012 | Suggs ........................... 345/156 |

(Continued)

FOREIGN PATENT DOCUMENTS

WO   2011131343 A1   10/2011

OTHER PUBLICATIONS

Dawkins, "Trig Cheat Sheet", downloaded from: http://tutorial.math.lamar.edu/pdf/Trig_Cheat_Sheet_Reduced.pdf, 2005, pp. 1-2.*

(Continued)

Primary Examiner — Dorothy Harris
(74) Attorney, Agent, or Firm — Morgan, Lewis & Bockius LLP

(57) ABSTRACT

Apparatuses and methods of calculating a touch orientation of a touch data measured on a sense array. One method calculates the touch orientation by determining a major axis length of the touch, determining a maximum width of the touch in a first axis, and calculating an inverse trigonometric function using the maximum width and the major axis length. Another method calculates the touch orientation by determining a centroid position of the touch and a touch outline of the touch, calculating perimeter distances between the centroid position and the touch outline, and calculating the orientation using the largest distance value of the calculated perimeter distances and the centroid position. Another method calculates the touch orientation by calculating eigenvalues and eigenvectors.

11 Claims, 11 Drawing Sheets

(56) References Cited

U.S. PATENT DOCUMENTS

| | | | |
|---|---|---|---|
| 2012/0030624 A1* | 2/2012 | Migos | 715/830 |
| 2012/0032891 A1* | 2/2012 | Parivar | 345/173 |
| 2012/0206377 A1* | 8/2012 | Zhao et al. | 345/173 |
| 2013/0176247 A1* | 7/2013 | Jogo et al. | 345/173 |

OTHER PUBLICATIONS

Su, et al, "Area of an Ellipse" Math Fun Facts http://www.math.hmc.edu/funfacts 1999-2010, pp. 1-2.* eMathZone.com, "Perimeter of an Ellipse", http://www.emathzone.com/tutorials/geometry/perimeter-of-an-ellipse.html, 2008-2012, pp. 1-2.*

Esri, "How Zonal Geometry works" downloaded from: http://resources.arcgis.com/en/help/main/10.1/009z/009z000000ws000000.htm., 1995-2012, pp. 1-6.*

Eberly, "Information about Ellipses" Geometric Tools, LLC, downloaded from: http://www.geometrictools.com, Oct. 22, 2011, pp. 1-6.*

"GG313 Lecture 15 Eigenvectors and Eigenvalues", Oct. 11, 2005, downloaded from: http://www.soest.hawaii.edu/GG/FACULTY/FRED/GG313/GG313_Lec_15_Eigen.ppt, pp. 1-17.*

Weisstein, Eric W. "Ellipse." From MathWorld—A Wolfram Web Resource. http://mathworld.wolfram.com/Ellipse.html, downloaded Dec. 22, 2012.*

Weisstein, Eric W. "Eccentricity." From MathWorld—A Wolfram Web Resource. http://mathworld.wolfram.com/Eccentricity.html, downloaded Dec. 22, 2012.*

Weisstein, Eric W. "Semimajor Axis." From MathWorld—A Wolfram Web Resource. http://mathworld.wolfram.com/SemimajorAxis.html, downloaded Dec. 22, 2012.*

Weisstein, Eric W. "Semiminor Axis." From MathWorld—A Wolfram Web Resource. http://mathworld.wolfram.com/SemiminorAxis.html, downloaded Dec. 22, 2012.*

Definition ellipticity downloaded from http://www.thefreedictionary.com/ellipticity on Oct. 22, 2014, 2 pages.*

"Trig Functions—Overview", downloaded Oct. 22, 2014 from http://math2.org/math/algebra/functions/trig/, 4 pages.*

Russell, R.A. (1993). "Sensing Surface Shape by Touch," Robotics and Automation, 1993 Proceedings, IEEE International Conference, Abstract Only.

Dawkins Paul, Trig Cheat Sheet, http://tutorial.math.lamar.edu/pdf/Trig_Cheat_Sheet.pdf, 2005, pp. 1-2.

Su, et al., Area of an Ellipse, Math Fun Facts, https://www.math.hmc.edu/funfacts/ffiles/10006.3.shtml, 1999-2010, pp. 1-2.

Written Opinion of the International Searching Authority for International Application No. PCT/US2012/53477 mailed Sep. 27, 2012; 15 pages.

* cited by examiner

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 12 | 18 | 13 | 0 | 0 | 0 | 0 | 0 |
| 0 | 0 | 8 | 30 | 36 | 39 | 28 | 1 | 0 | 0 | 0 |
| 0 | 0 | 16 | 36 | 42 | 46 | 41 | 30 | 0 | 0 | 0 |
| 0 | 0 | 10 | 37 | 44 | 49 | 44 | 39 | 9 | 0 | 0 |
| 0 | 0 | 0 | 31 | 43 | 48 | 43 | 36 | 17 | 0 | 0 |
| 0 | 0 | 0 | 5 | 34 | 45 | 43 | 34 | 9 | 0 | 0 |
| 0 | 0 | 0 | 0 | 1 | 20 | 27 | 16 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 17 | 32 | 36 | 31 | 17 | 0 | 0 | 0 |
| 0 | 0 | 25 | 36 | 45 | 47 | 45 | 39 | 24 | 0 | 0 |
| 0 | 5 | 28 | 37 | 47 | 50 | 48 | 42 | 35 | 2 | 0 |
| 0 | 0 | 25 | 34 | 44 | 48 | 48 | 44 | 33 | 0 | 0 |
| 0 | 0 | 4 | 23 | 35 | 38 | 37 | 24 | 1 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

Touch Perimeter $\frac{1}{2} \cdot$ Major Axis Length $\frac{1}{2} \cdot$ Minor Axis Length Figure 5: Orientation Figure 6: Ellipse Fitting

TOUCH ORIENTATION CALCULATION

TECHNICAL FIELD

The present disclosure relates generally to capacitance-sensing systems, and more particularly to capacitance-sensing systems configured to calculate touch orientations.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance; 1) mutual capacitance where the capacitance-sensing circuit has access to both electrodes of the capacitor; 2) self capacitance where the capacitance-sensing circuit has only access to one electrode of the capacitor where the second electrode is tied to a DC voltage level. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings in which:

FIG. 6 is a graphical representation of a 2D image of pixels of touch data measured on a sense array according to one embodiment.

FIG. 7 is a graphical representation of a 2D image of pixels of touch data measured on the sense array according to another embodiment.

FIG. 8 is a graphical representation of a 2D image of pixels of touch data measured on the sense array according to another embodiment.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
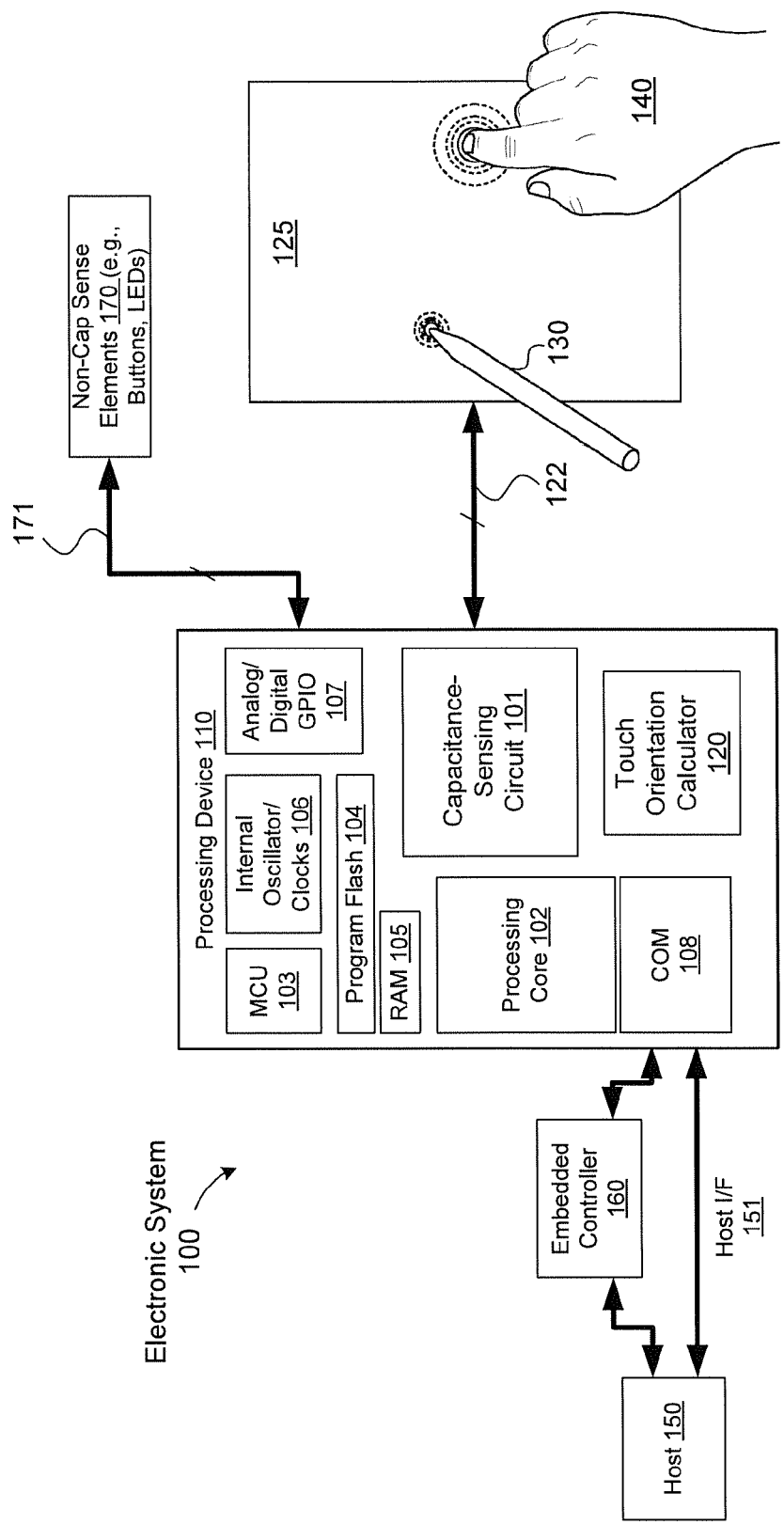
FIG. 1 is a block diagram illustrating one embodiment of an electronic system having a processing device, including the touch orientation calculator.

FIG. 1 is a block diagram illustrating one embodiment of an electronic system 100 having a processing device 110, including the touch orientation calculator 120. The processing device 110 is configured to detect one or more touches on a touch-sensing device, such as the capacitive sense array 125. The processing device can detect conductive objects, such as touch objects 140 (fingers or passive styluses, an active stylus 130, or any combination thereof. The embodiments of the touch orientation calculator 120, as described herein, can calculate a touch orientation of a touch from data measured on the capacitive sense array 125. The touch orientation calculator 120 can model the touch as an ellipse. In one embodiment, the touch orientation calculator 120 calculates the touch orientation by determining a major axis length of the touch, determining a width of a signal profile, which is a projection of the major axis on a first axis, and calculating an inverse trigonometric function using the width and the major axis length. In another embodiment, the touch orientation calculator 120 calculates the touch orientation by determining a centroid position of the touch and a touch outline of the touch, calculating perimeter distances between the centroid position and the touch outline, and calculating the orientation using the largest distance value of the calculated perimeter distances and the centroid position. In another embodiment, the touch orientation calculator 120 calculates the touch orientation by calculating eigenvalues and eigenvectors as described below.

The touch orientation calculator 120 has the ability to calculate aspect ratio, touch orientation (also referred to herein as touch angle), and report these values in addition to the centroid position of the touch. In one embodiment, the touch orientation calculator 120 calculates a touch vector that includes a touch orientation and aspect ratio of the touch. These quantities may be used in advanced gestures to initiate an action by the host processor 150 attached to the processing device 110. It should also be noted that although a touch vector may be computed with the touch orientation and the aspect ratio, the touch vector may include other values, or those values may be reported separately and not part of a touch vector. Although the embodiments described herein are described in the context of capacitive sensing, the embodiments may also be used in optical sensors. For example, optical sensors may be used to obtain touch data, and the touch orientation calculator can process the touch data to calculate the touch orientation, aspect ratio, or the like.

There are some conventional solutions that may be able to calculate and report the touch angles of 0° and 90°, but cannot calculate and report the touch angles between 0° and 90°. Also, these conventional solutions do not calculate and report aspect ratios.

In one embodiment, the touch orientation calculator 120 is implemented in firmware of the processing device 110. In another embodiment, the touch orientation calculator 120 is implemented in software, hardware, or any combination thereof. In another embodiment, the touch orientation calculator 120 is implemented as part of a gesture recognition tool that calculates and reports gestures. In another embodiment, the touch vector is calculated by the touch orientation calculator 120 and sent as raw data to the host processor 150. In another embodiment, the touch orientation calculator 120 can be implemented on the host, and the capacitive-sensing circuit 101 obtains the touch data and sends the touch data to the touch orientation calculator 120 on the host processor 150. Alternatively, other configurations are possible as would be appreciated by one of ordinary skill in the art having the benefit of this disclosure.

The touch coordinates and touch orientations may be used for gesture recognition in various application. One example is a gaming application where the touch orientation can be used to indicate a direction (e.g. to aim a missile, etc) without the need to move the finger. Another example of touch vector application is a rotation implementation, where the user can rotate an image by a required angle. The touch vector can also be used in zoom-gesture applications. For example, a light touch with circular finger print has an aspect ratio of one, and it could represent normal view of an image (no-zoom), and as the finger touch is flattened on the touch sensor, the aspect ratio keeps growing, and its value can be used to zoom in or out the image. Some conventional solutions could use complex image processing to figure out the touch orientation. The embodiments described herein may calculate the touch orientation quicker and with less computational resources than conventional image processing. It should also be noted that the embodiments described herein use oval shapes for examples of computing the touch position, the touch orientation, or the like. However, as long as the touch objects produce simple geometries, such a square or a rectangle, the touch orientation calculator 120 can calculate the touch orientation. For example if the object has a rectangular foot print, the touch orientation calculator 120 can still count the number of touched pixels in the foot print and figure out the dimensions of the rectangle and thus its orientation. Additional details of the computations by the touch orientation calculator 120 are described below with respect to FIGS. 2-11.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configured to allow the capacitive-sensing circuit 101 to measure self capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configured to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems)

using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array may also be configured to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configured to measure capacitance using mutual capacitance sensing techniques, self capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx family of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance-sensing circuit 101 does not use mutual capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2:
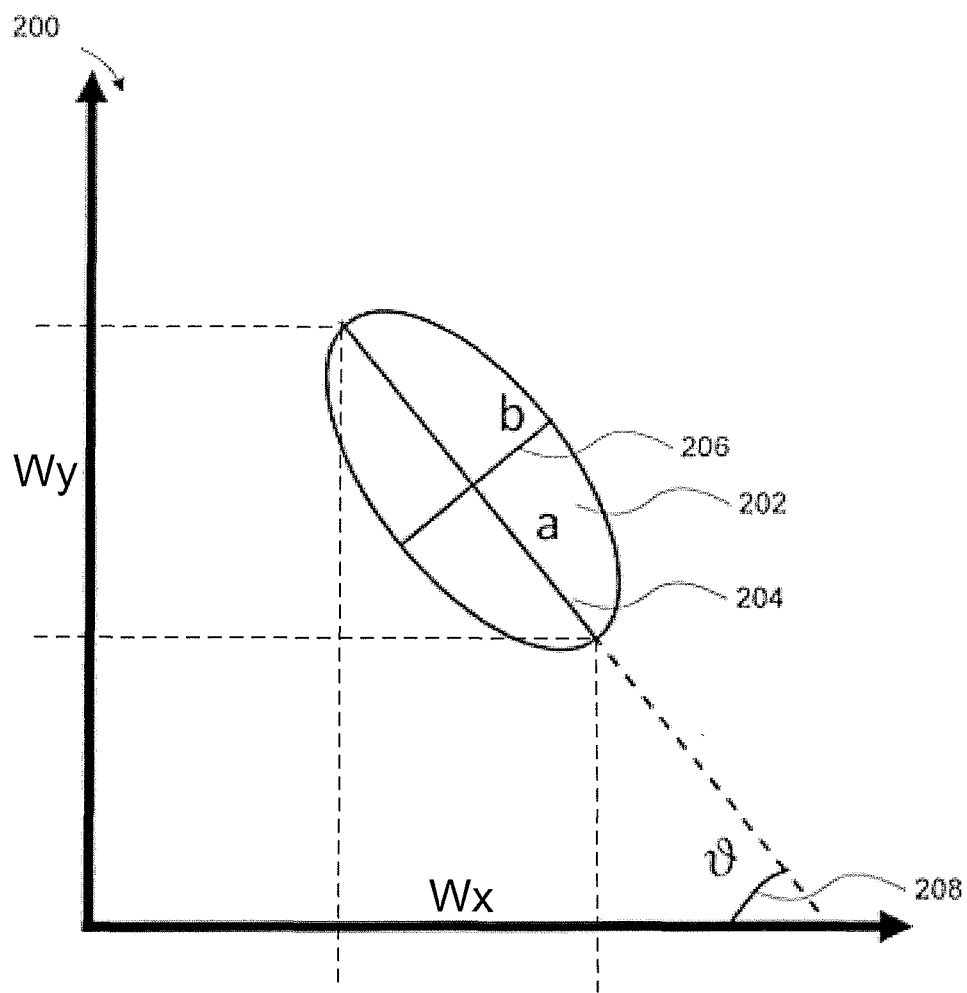
FIG. 2 is a two-dimensional (2D) graph illustrating a touch with a touch orientation according to one embodiment.

FIG. 2 is a two-dimensional (2D) graph 200 illustrating a touch 202 and a touch orientation according to one embodiment. The graph 200 represents a touch surface of a sense array and corresponding touch data of the touch 202. The touch 202 has an elliptical shape with a major axis length (a) 204 and a minor axis length (b) 206. The touch 202 has a touch coordinate in the 2D graph. The touch orientation calculator 120 can calculate the touch coordinate, such as using a centroid calculation that calculates the touch coordinate of the centroid position of the touch 202. Alternatively, the touch coordinate can be calculated by another tool, and can be an input to the touch orientation calculator 120. However, because the touch 202 is not vertical or horizontal at 0° or 90°, the touch 202 has a touch orientation, as indicated by a touch angle 208. The touch angle 208 can be an arbitrary angle between 0° or 90°. Of course, the touch orientation calculator 120 can also determine the touch angle 208 to be 0° or 90°. In this embodiment, the touch angle 208 is with respect to an X-axis of the graph 200. Of course, the touch angle 208 can be determined with respect to a y-axis of the graph 200. Alternatively, the touch angles may be between 0° or 180°, or any arbitrary range as would be appreciated by one of ordinary skill in the art having the benefit of this disclosure. It should also be noted that identical physical orientations could be reported as 180 degrees and −90 degrees (or other values that are physically equivalent).

The touch orientation calculator 120 can calculate an aspect ratio of the touch 202. The aspect ratio is simply equal to the major axis length 204 divided by the minor axis length 206

$$\left(\text{aspect ratio} = \frac{a}{b}\right),$$

where a is the major axis length and b is the minor axis length. The touch orientation calculator 120 can calculate the touch angle 208 and the aspect ratio of the oval touch when the touch 202 has an arbitrary orientation.

In one embodiment, the touch orientation calculator 120 can determine a touch area and a touch perimeter of the touch 202 by the following relations in equations (1) and (2):

$$A = \pi(ab) \tag{1}$$

$$P = \pi(a+b). \tag{2}$$

By determining the touch area and the touch perimeter of the touch 202, the touch orientation calculator 120 can calculate the major axis length 204 and the minor axis length 206 of the touch 202. For example, once the touch area and the touch perimeter is determined, the touch orientation calculator 120 can solve for a and b using equations (1) and (2). Then knowing a and b, the touch orientation calculator 120 can take the ratio of a and b to get the aspect ratio.

The touch angle calculation is not as straight forward as the aspect ratio. To get the touch angle, the touch orientation calculator 120 can calculate a signal profile of the touch 202 and use a width (Wx) of the signal profile, which is the projection of the major axis on the x-axis to compute an inverse trigonometric function to determine the touch angle 208. In one embodiment, the touch orientation calculator 120 determines the signal profile in the X and Y directions as well. The signal profiles can be used to find the widths of the profiles in the X and Y directions, referred to as Wx and Wy, respectively. It is clear that if the touch 202 is vertical in the 2D graph 200, i.e., the major axis of the touch 202 is parallel to Y-axis, Wx=b and Wy=a. On the other hand, if the touch 202 is horizontal in the 2D graph 200, i.e., the major axis of the touch 202 is parallel to X-axis, Wx=a, and Wy=b. Using the width of profiles, the touch orientation calculator 120 can determine if the touch angle 208 is 0 or 90°. If the touch angle 208 is anything between 0 or 90°, the touch orientation calculator 120 can use Wx or Wy as well as a or b of the touch 202 to obtain the touch angle 208. For example, the touch orientation calculator 120 can use Wx and a to obtain the touch angle 208 as set forth in the following equation (3):

$$\theta = \arccos\left(\frac{Wx}{a}\right). \tag{3}$$

Various embodiments of computing the touch orientation 208 using the aspect ratio and signal profiles are described below with respect to FIGS. 4, and 6-8.

Figure 3:
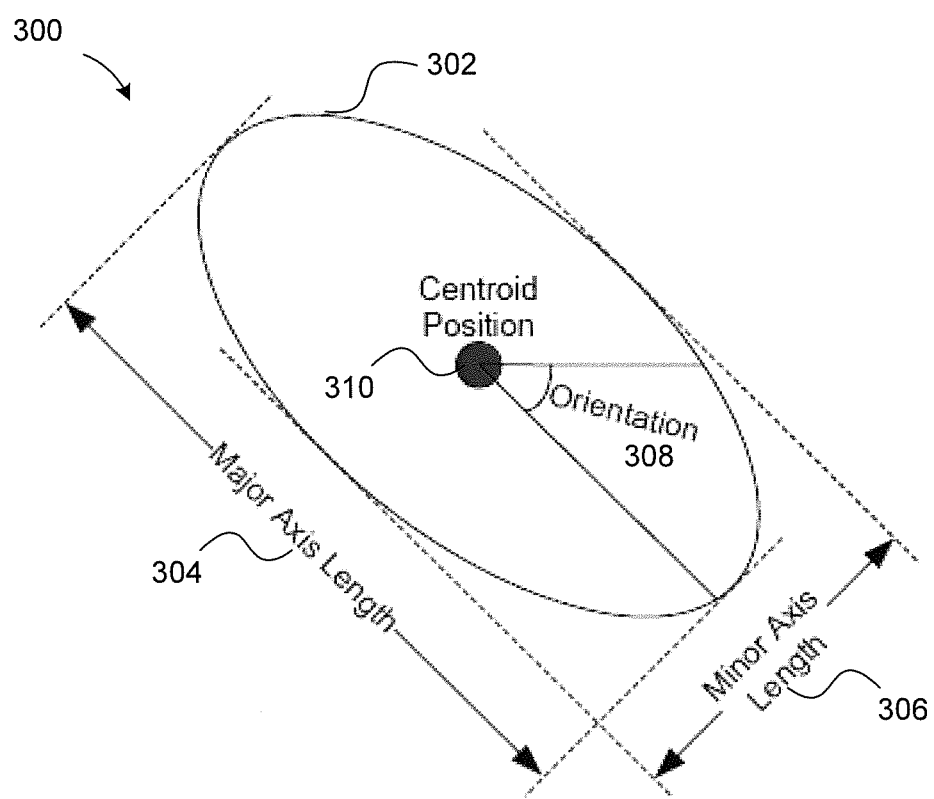
FIG. 3 is a 2D graph illustrating a touch and a touch orientation according to another embodiment.

FIG. 3 is a 2D graph 300 illustrating a touch 302 and a touch orientation 308 according to another embodiment. The graph 300 represents a touch surface of a sense array and corresponding touch data of the touch 302. The touch 302 has an elliptical shape with a major axis length (a) 304 and a minor axis length (b) 306. The touch 302 has a touch coordinate, labeled as centroid position 310. Like above, the touch orientation calculator 120 can calculate the touch coordinate, such as using a centroid calculation that calculates the centroid position 310 of the touch 302. Alternatively, the touch coordinate can be calculated by another tool, and can be an input to the touch orientation calculator 120. In this embodiment, touch orientation 308 is computed by the touch orientation calculator 120 using another technique than described above with respect to FIG. 2. In this embodiment, the touch orientation calculator 120 can calculate the major axis length 304, the minor axis length 306, and the orientation 308 using the centroid position 310. Embodiments of computing these values are described below with respect to FIGS. 9A-9D.

In one embodiment, the touch orientation calculator 120 calculates the major axis length 304 with 4-bits of precision, and the minor axis length 306 with 4-bits of precision. The touch orientation calculator 120 can calculate with 7-bits of precision with a sign bit. The touch orientation calculator 120 may include the capability to apply a scale factor or an offset (e.g., 8-bits each) to the major axis length 304 and minor axis length 306 in order to maximize a dynamic range of the available bits. The touch orientation calculator 120 may accommodate calculation and reporting for one or more fingers. In one embodiment, the touch orientation calculator 120 may calculate and report touch angles on ten touches. In one embodiment, the touch orientation calculator 120 can include parameters such as offset for minor axis, offset for major axis, scale for minor axis, scale for major axis, a number of fingers to calculate touch orientation (also referred to as touch rotation), IIR filter setting for reported orientation, or the like. These parameters may be configurable parameters.

In other embodiments, the touch orientation calculator 120 may be used with other touch and gesture algorithms, such as a fat finger algorithm that handles touch data of a fat finger touch differently than a normal finger touch. Fat finger algorithm uses a larger than usual matrix to carry out the centroid calculations. For example, if for a normal finger a 3×3 matrix of touch signals are used, a fat finger may use 5×5 or even 7×7 matrix to figure out the centroid position. Although the centroid calculations may be different for a fat finger compared to a normal size finger, the methods and embodiments described here for touch orientation calculations would equally apply to them.

Figure 4:
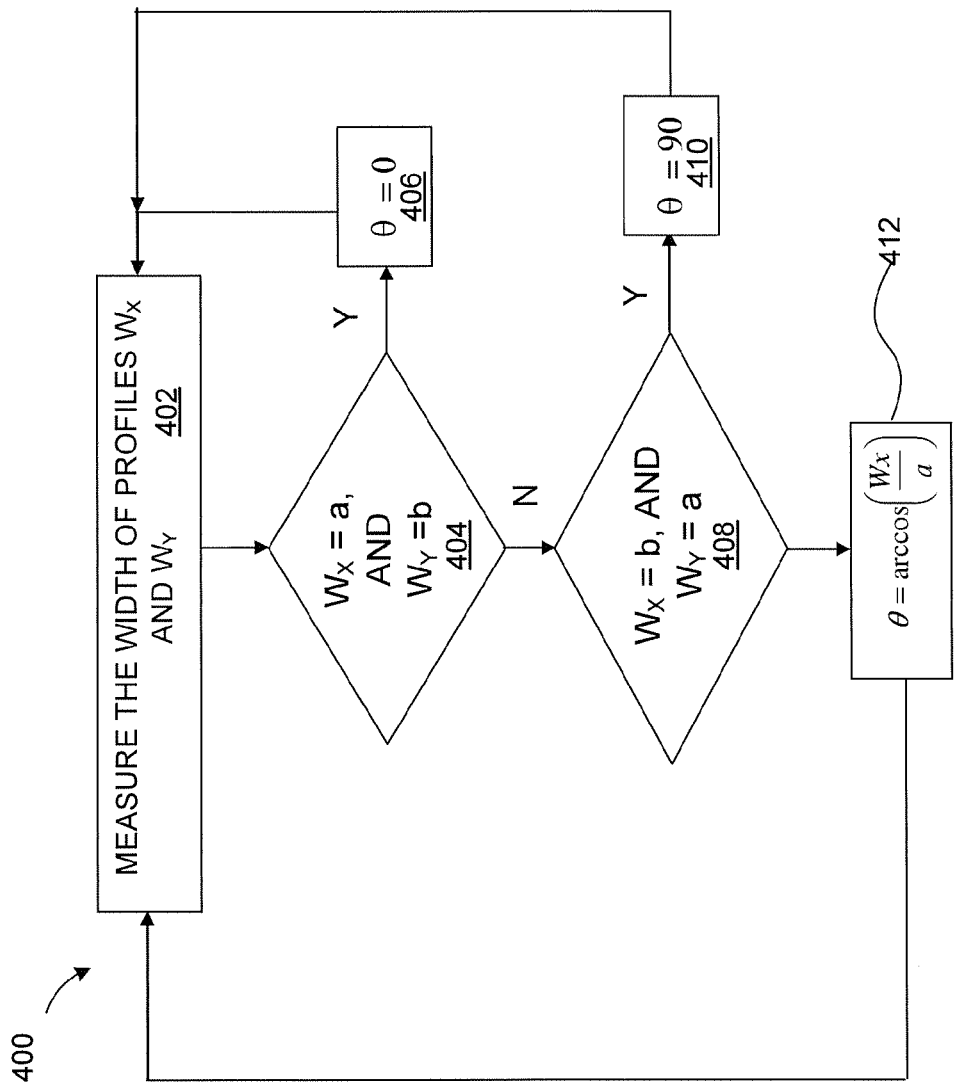
FIG. 4 is a flow diagram of a method of calculating a touch orientation Of a touch according to an embodiment.

FIG. 4 is a flow diagram of a method 400 of calculating a touch orientation of a touch according to an embodiment. The method 400 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 400. In another embodiment, the touch orientation calculator 120 performs the method 400. Alternatively, other components of the electronic system 100 perform some or all of the operations of method 400.

Referring to FIG. 4, the method 400 begins with measuring the widths of signal profiles $W_X$ and $W_Y$ (block 402). Next, the processing logic determines if the major axis length (a) is equal to the width $W_X$ and the minor axis length (b) is equal to the width $W_Y$ (block 404). If so, the touch angle is equal to zero (0°) (block 406), and the method 400 returns to block 402. If the conditions at block 404 are not met, the processing logic determines if the minor axis length (b) is equal to the width $W_X$ and the major axis length (a) is equal to the width $W_Y$ (block 408). If so, the touch angle is equal to ninety degrees (90°) (block 410), and the method 400 returns to block 402. If the conditions at block 408 are not met, the processing logic computes the touch angle using the following equation (3) (block 412), and the method 400 returns to block 402:

$$\theta = \arccos\left(\frac{Wx}{a}\right). \quad (3)$$

The result of equation (3) includes a touch angle between 0° and 90° and represents the touch orientation of the touch. The method 400 may be performed to calculate the touch orientation for each of the touches when multiple touches are detected. The method 400 may be used to determine when the touch orientation is 0° and 90° and when the touch orientation is an arbitrary angle between 0° and 90°. As noted above, the touch angles may be between other ranges, such as 0° or 180°.

In this embodiment, the arccosine is used with the width of the signal profile along X-axis ($W_X$) and the major axis length (a) to compute the touch angle. In another embodiment, the method may compute the touch orientation using other trigonometric functions or inverse trigonometric functions. For example, alternative application of the inverse trigonometric functions that include a projection of the minor axis on a first axis, or a projection of the major or minor axis on a second axis may be used.

The flow chart of FIG. 4 shows how the touch orientation can be determined from the touch data by the touch orientation calculator, which may be implemented in a capacitive touch screen controller. In one embodiment, the capacitive touch screen controller is the TrueTouch® capacitive touch-screen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports leading operating systems, and is optimized for low-power multi-touch gesture and all-point touchscreen functionality. Alternatively, the touch orientation calculation features may be implemented in other touchscreen controllers, or other touch controllers of touch-sensing devices. In one embodiment, the touch orientation calculation features may be implemented with other touch filtering algorithms as would be appreciated by one of ordinary skill in the art having the benefit of this disclosure.

The embodiments described herein may be used in various designs of mutual capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

Figure 5:
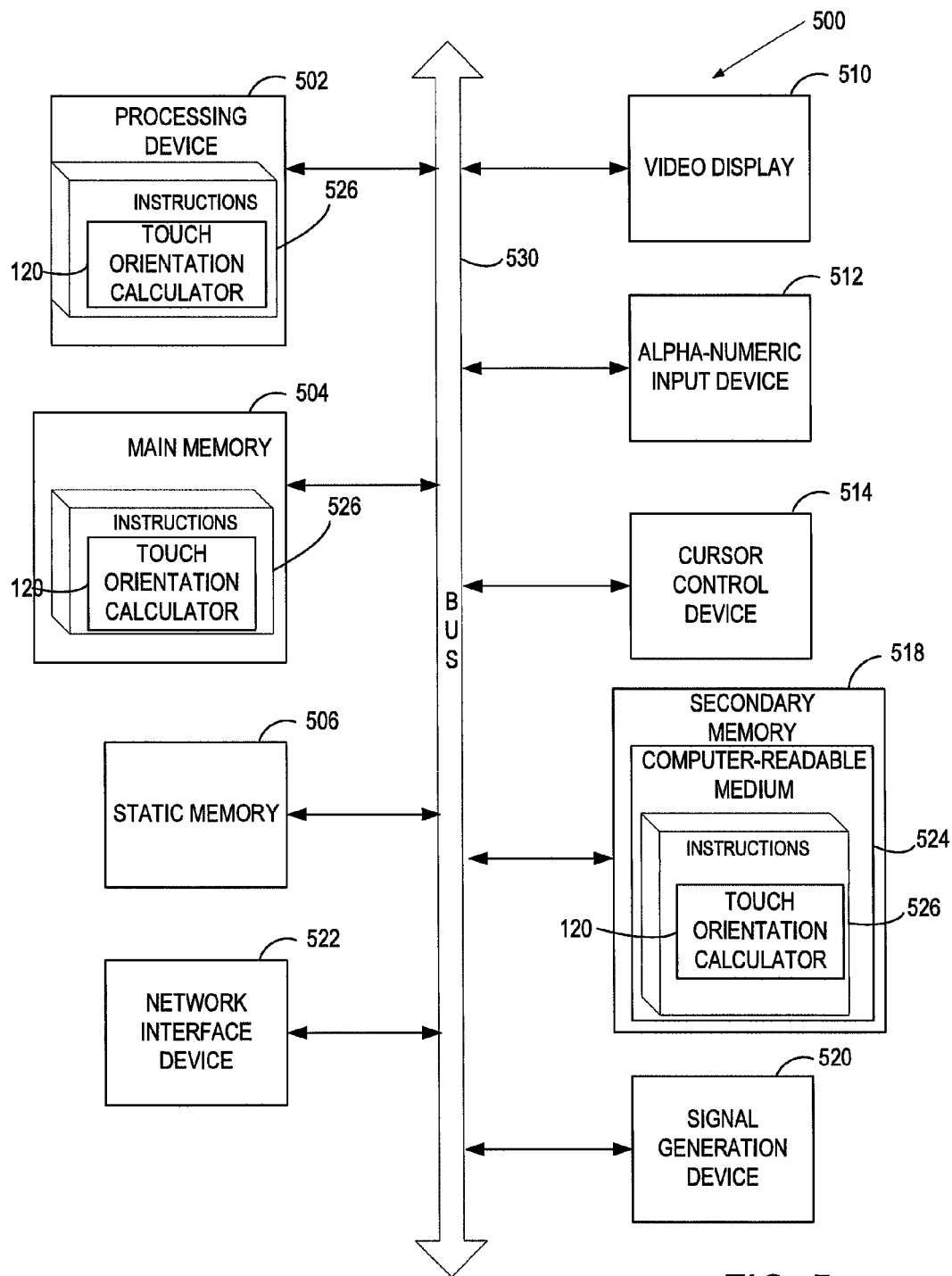
FIG. 5 is a diagram of one embodiment of a computer system for touch orientation calculation.

FIG. 5 is a diagram of one embodiment of a computer system for touch orientation calculation. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502 (e.g., host device 150 or processing device 110 of FIG. 1), a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the touch orientation calculator 120. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination of hardware devices and software components.

Figure 8:
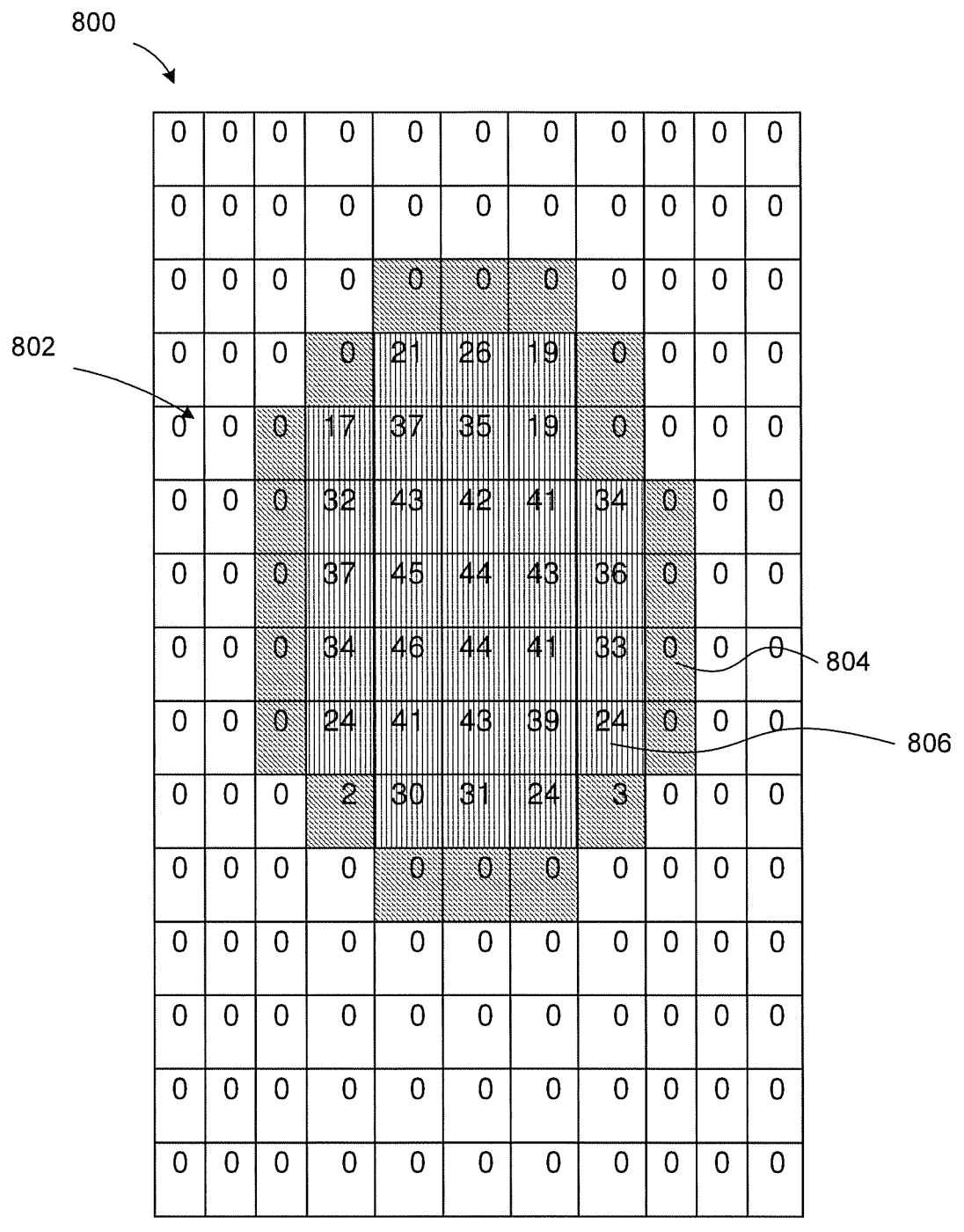
Figure 9A:
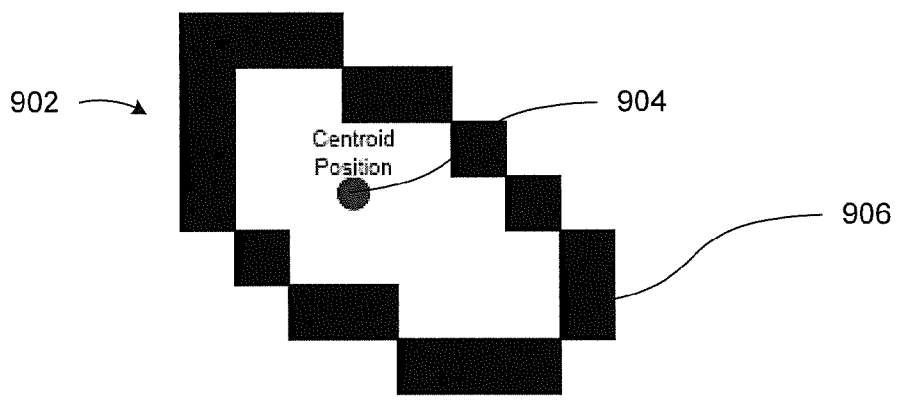
FIG. 9A illustrates the touch orientation calculator calculating a centroid position of the touch according to one embodiment.
Figure 9B:
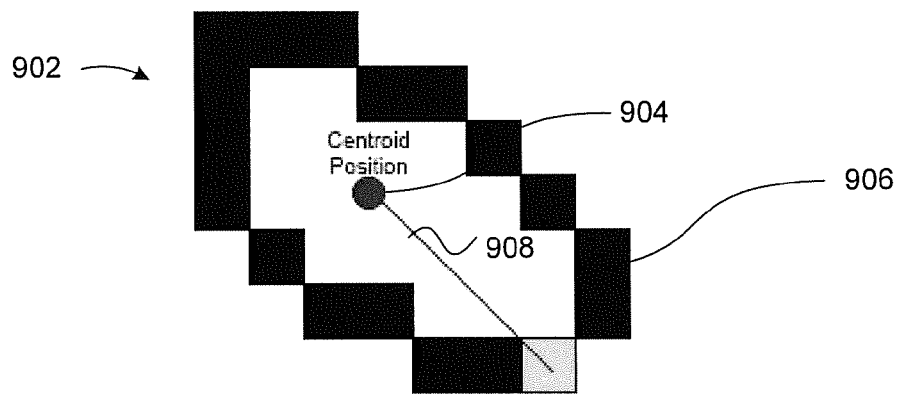
FIG. 9B illustrates the touch orientation calculator calculating a major axis length of the touch according to one embodiment.
Figure 9C:
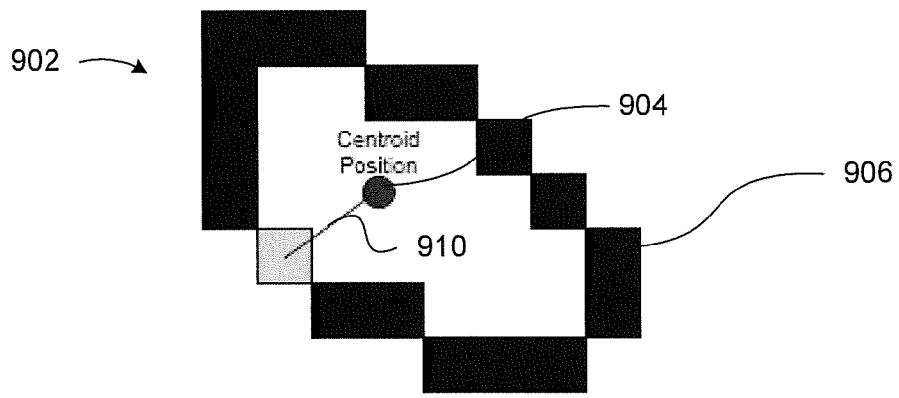
FIG. 9C illustrates the touch orientation calculator calculating a minor axis length of the touch according to one embodiment.
Figure 9D:
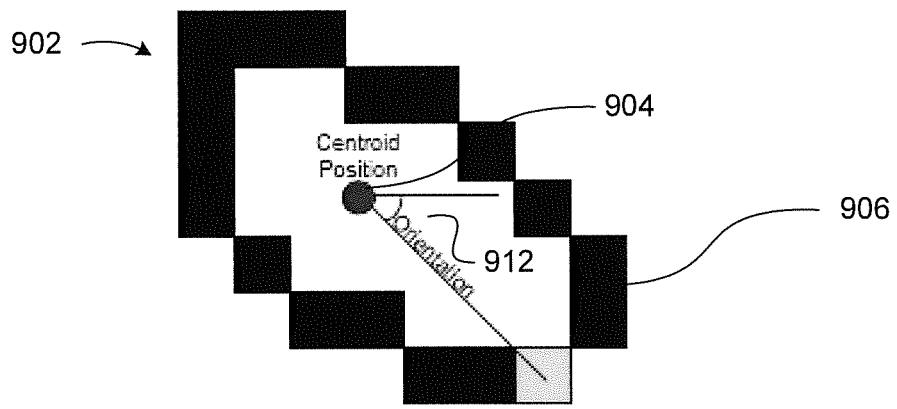
FIG. 9D illustrates the touch orientation calculator calculating a touch orientation of the touch according to one embodiment.
Figure 10:
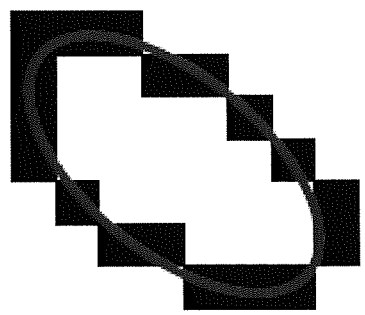
FIG. 10 illustrates the touch orientation calculator performing an ellipse fitting process according to one embodiment.
Figure 11:
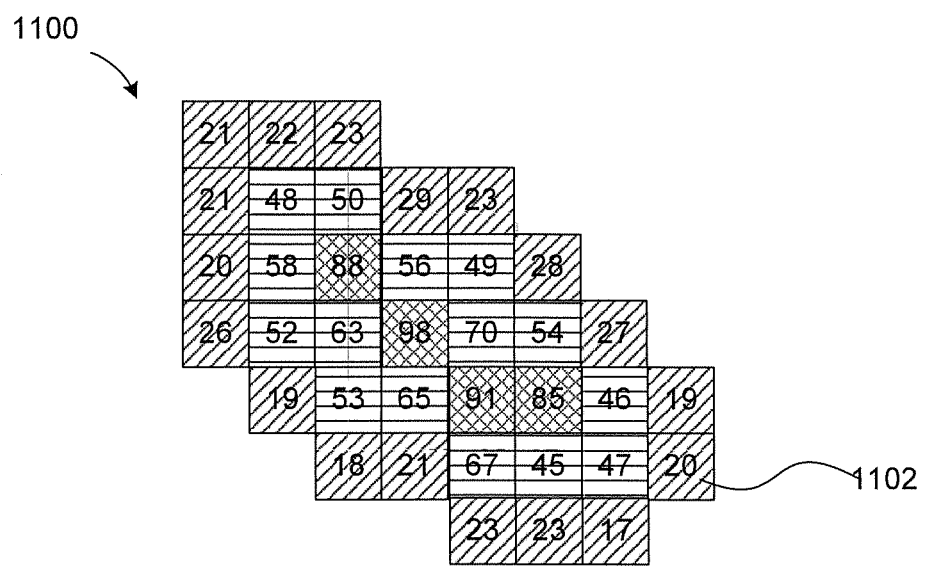
FIG. 11 illustrates a 2D capacitive image obtained from the sense array that is used to calculate the touch orientation using eigenvalues and eigenvectors.

FIGS. 6-11 illustrate various embodiments of calculating the touch orientation of a touch. More specifically, FIGS. 6-8 illustrate 2D capacitive images obtained from a sense array that are used to calculate the touch orientation. FIGS. 9A-9D illustrate different computations made by the touch orientation calculator 120 to calculate the touch orientation. FIG. 10 illustrates another technique that uses ellipse fitting to calculate the touch orientation. FIG. 11 illustrates a 2D capacitive image obtained from the sense array that is used to calculate the touch orientation using eigenvalues and eigenvectors.

When the capacitance-sensing circuit 101 is configured to measure mutual capacitance of the touch-sensing device (e.g., capacitive sense array 125), the capacitance-sensing circuit 101 obtains a 2D capacitive image of the touch-sensing device and processes the data for positional information. In one embodiment, the touch orientation calculator 120 counts the number of pixels inside the touch ellipse and at the border of the ellipse to compute the touch area of the touch and the touch perimeter of the touch. In a further embodiment, the touch orientation calculator 120 multiplies the pixel count by a sense element pitch squared $\delta^2$ for the touch area and by the sense element pitch $\delta$ for the touch perimeter. The sense element pitch, also referred to as sensor pitch, is defined as the width of the sense elements and the spacing between the sense elements. This distance can be measured from one edge of a sense element to the same edge of the next element. The distance can also be measured from center of one of the sense elements to the center of next sense element. The distance can also be measured in other ways as would be appreciated by one of ordinary skill in the art having the benefit of this disclosure. It should also be noted that touch-sensing device may have different pitch sizes on the X and Y axes; thus, two or more values for the sense element pitch $\delta$ can be identified.

By counting the number of pixels and multiplying it by the pitch, the touch orientation calculator 120 can determine the touch area A and the touch perimeter P. Once the touch area A and the touch perimeter P are determined, the touch orientation calculator 120 can solve for the major axis length a and the minor axis length b using the equations (1) and (2). Knowing a and b, the touch orientation calculator 120 can determine the aspect ratio. Also, as described above, the touch orientation calculator 120 can use the aspect ratio to calculate the touch orientation. For example, the touch angle calculation can use the signal profile in the X and Y directions as well. The touch orientation calculator 120 can find the widths of the profiles in the X and Y directions, referred to as $W_X$ and $W_Y$, respectively, as described above. It is clear that if a finger touches the sense array vertically (long axis of the touch parallel to Y-axis), $W_X=b$ and $W_Y=a$. On the other hand, if the finger touches the sense array horizontally, $W_X=a$, and $W_Y=b$.

So, the width of profiles can definitely indicate if the touch angle is 0 or 90°. If the touch angle is anything between 0 or 90°, the touch orientation calculator can use $W_X$ or $W_Y$ as well as a or b of the touch ellipse to calculate the touch angle. For example, as described above, the touch angle can be calculated using equation (3).

FIG. 6 is a graphical representation of a 2D image 600 of pixels of touch data measured on a sense array according to one embodiment. The pixels of the 2D image 600 include a number value representing the capacitance difference between the measured capacitance and a baseline value. The touch data can be represented as a matrix of the capacitance difference values. The touch data can be processed to determine a touch perimeter 604 of a touch 602, as well as the touch area 606 of the touch 602 by counting the pixels. In the depicted embodiment, the pixels of the touch perimeter 604 are designated as hatched pixels and the pixels of the touch area 606 are designated as horizontal lined pixels. The touch orientation calculator 120 can determine a touch outline of the touch 602 by evaluating transitions between the pixels that have a capacitance difference value (or a capacitance different value above a certain amount) and those pixels that do not have any value (or a value that is below the certain amount). In the depicted embodiment, the touch orientation calculator 120 counts 20 pixels for the touch perimeter 604. The touch orientation calculator 120 determines the touch area 606 of the touch 602 by counting the pixels within the touch perimeter 604. In the depicted embodiment, the touch orientation calculator 120 counts 32 pixels for the touch area 606. The touch orientation calculator 120 solves the equations (1) and (2), resulting in the major axis length a=21 mm and the minor axis length b=11 mm. The touch orientation calculator 120 determines the signal profiles width $W_X$ as 9 pixels, and solves for the touch angle, resulting in the touch angle θ=36°.

It should be noted that the touch perimeter and touch area are not smooth and is not completely elliptical. In one embodiment, the touch orientation calculator 120 can filter the touch data to smooth out the shape of the touch 602. For example, the touch orientation calculator 120 can take the average of all the nearest neighboring pixels to replace each pixel value to smooth out the shape represented in the data. Additional filtering can be done before or after computing the touch perimeter and touch area of the touch 602 as part of determining the touch outline.

FIG. 7 is a graphical representation of a 2D image 700 of pixels of touch data measured on the sense array according to another embodiment. The depicted embodiment illustrates when a touch 702 is horizontal on the sense array. In the depicted embodiment, the touch orientation calculator 120 counts 20 pixels for the touch perimeter 704. The touch orientation calculator 120 determines a touch area 706 of the touch 702 by counting the pixels within the touch perimeter 704. In the depicted embodiment, the touch orientation calculator 120 counts 31 pixels for the touch area 706. The touch orientation calculator 120 solves the equations (1) and (2), resulting in the major axis length a=37 mm and the minor axis length b=26 mm. The touch orientation calculator 120 determines the signal profiles width $W_X$ as 7 pixels (equivalent to 37 mm), and solves for the touch angle, resulting in the touch angle θ=0°.

FIG. 8 is a graphical representation of a 2D image of pixels of touch data measured on the sense array according to another embodiment. The depicted embodiment illustrates when a touch 802 is vertical on the sense array. In the depicted embodiment, the touch orientation calculator 120 counts 20 pixels for the touch perimeter 804. The touch orientation calculator 120 determines a touch area 806 of the touch 802 by counting the pixels within the touch perimeter 804. In the depicted embodiment, the touch orientation calculator 120 counts 30 pixels for the touch area 806. The touch orientation calculator 120 solves the equations (1) and (2), resulting in the major axis length a=39.4 mm and the minor axis length b=24 mm. The touch orientation calculator 120 determines the signal profiles width $W_X$ as 5 pixels (equivalent to 26 mm which is approximately equal b), and solves for the touch angle, resulting in the touch angle θ=90°.

As shown in FIGS. 6-8, the computed major axis length a and minor axis length b for each of the touches 602, 702, and 802 is roughly consistent in the three measurements, and the touch angles are estimated with good accuracy.

The following embodiments of FIGS. 9A-9D illustrate another technique for calculating touch orientation.

In FIG. 9A, the touch orientation calculator 120 calculates a location of a touch 902. In one embodiment, the touch orientation calculator 120 determines a centroid position 904 of the touch 902, such as using a standard peak-detection algorithm. The touch orientation calculator 120 also determines a touch outline 906 of the touch 902. In one embodiment, an algorithm can be used to figuratively walk the perimeter of the touch 902 to determine the touch outline 906. For example, the algorithm can log the row and column numbers of the touch outline 906 for later processing.

Next, the touch orientation calculator 120 calculates perimeter distances between the centroid position 904 and the touch outline 906. In one embodiment, the touch orientation calculator 120 computes the distance between each row-column pair in the touch outline 906 and the centroid position 904, and finds the largest distance 908 and shortest distance 910. The largest distance value 908 of the perimeter distances is used to determine the major axis length a, as illustrated in FIG. 9B. The major axis length a is twice the largest distance value 908 and the largest distance value 908 is half the major axis length. The shortest distance value 910 of the perimeter distances is used to determine the minor axis length b, as illustrated in FIG. 9C. The minor axis length b is twice the smallest distance value 910 and the shortest distance value 910 is half the minor axis length.

The position with the largest distance is used to determine both the orientation 912 and the major axis length. The major axis length may simply be reported as twice the largest value 908. The shortest distance is used to report the minor axis length. The minor axis length may simply be reported as twice the shortest value 910. To compute the orientation 912 of the touch 902, the touch orientation calculator 120 may use the row-column pair that is measured as the farthest distance from the centroid position 904. The orientation 912 of the touch 902 is determined relative to the centroid position 904 with the centroid position becoming the origin. In particular, the touch orientation calculator 120 can determine a first difference between the y-coordinate of the centroid position 904 and the y-coordinate of the row-column pair that measures the farthest distance from the centroid position 904, and the x-coordinate of the centroid position 904 and the x-coordinate of the row-column pair that measures the farthest distance from the centroid position 904. The touch angle is the arctan of the first distance and the second distance. The result can be multiplied by 180 divided by π to convert to degrees. The touch orientation 912 is the negative of the computed touch angle.

In one embodiment, the following algorithm may be used to calculate the touch orientation 912 using the centroid position 904.

```
1 % This code assumes a valid centroid is stored in (xCent,yCent)
for a touch
2
3 % Get the perimeter of an object
4 %(this may be done in a fat finger algorithm)
5 [perimeterFrame, numCells, x, y] = GetPerimeter(shapeMask);
6
7 angles = zeros(numCells, 1);
8 distances = zeros(numCells, 1);
9 maxDist = 0;
10 minDist = 9999;
11 maxDistIndex = 0;
12 for i = 1:numCells,
13     distances(i) ˆ(yCent − y(i))ˆ2 +(xCent − x(i))ˆ2; %
        actually distance ˆ2
14
15     if distances(i) > maxDist,
16   maxDist = distances(i);
17   maxDistIndex = i;
18     end
19
20     if distances(i) < minDist,
21   minDist = distances(i);
22     end
23 end
24
25 maxDist = EmbeddedSqrt(maxDist, 7);
% maxDist = sqrt(maxDist);
26 minDist = EmbeddedSqrt(minDist, 7);
% maxDist = sqrt(maxDist);
27
28 majorAxisLength = maxDist * 2+ 1;
29 minorAxisLength = minDist * 2+ 1;
30
31 % Make sure the minimum aspect ratio is met to report
orientation
32 if (majorAxisLength < minAspectRatio * minorAxisLength),
33     orientation = 0;
34 else
35     yDiff = (yCent−y(maxDistIndex));
36     xDiff = (xCent−x(maxDistIndex));
37     angle = EmbeddedArcTan( yDiff , xDiff )* 180/pi;
38     orientation = −angle;
39 end
```

Alternatively, other algorithms may be used to compute the touch orientation 912 with or without the centroid position 904 as would be appreciated by one of ordinary skill in the art having the benefit of this disclosure.

In another embodiment, the processing device is a microcontroller that obtains a capacitance touch signal data set, such as from a sense array, and finger detection firmware executing on the microcontroller identifies data set areas that indicate touches and calculates the centroid coordinates. The firmware identifies the data elements located at the edge of the contact, and calculates the distance between the contact area centroid coordinates and the coordinates affiliated with each edge element. The firmware derives the minor axis length from the smallest distance and the major axis length from the largest distance. The firmware also derives the major axis angle with respect to the sense array's Y-axis from the largest distance's affiliated coordinates and the centroid coordinates. The microcontroller can report the coordinates to a host device, as well as the touch orientation.

FIG. 10 illustrates the touch orientation calculator performing an ellipse fitting process according to one embodiment. In this embodiment we assume that the contour of the touch footprint is an ellipse of the equation (4):

$$\frac{(X-X_0)^2}{a^2} + \frac{(Y-Y_0)^2}{b^2} = 1, \tag{4}$$

where X0 and Y0 are the XY coordinates of the center of ellipse determined by the centroid algorithm. In this embodiment first the XY coordinates of all the points on the touch boundary are found. The coordinates of each boundary point should satisfy Equation (4). Therefore, a and b in Equation (4) should be such that the accumulated error due to enforcing boundary points into Equation (4) is minimized. From Equation (4) Y can be written as a function of X, a and b, as shown in equation (5):

$$Y = f(X, a, b) \tag{5}$$

The square of the error of curve fitting at each boundary point (Xi, Yi) is $$R_i^2 = [Y_i - f(X_i, a, b)]^2 \tag{6}$$

The sum of $R^2$ values over all boundary points should be minimized to have the best fit. This means that $$\frac{\partial \sum R_i^2}{\partial a} = 0, \tag{7}$$

$$\frac{\partial \sum R_i^2}{\partial b} = 0,$$

Where the above sums are over all indices "i" corresponding to the boundary points. The above two partial derivatives give two equations for two unknowns a and b which can be solved simultaneously to yield a and b for the best fitted ellipse. Once the a and b are calculated, the aspect ratio is readily obtained, and the touch angle can be obtained by Equation (1) with the help of Wx measurement.

The following embodiments describe using moments of inertia and products of inertia to characterize the distribution of the touch data. The embodiments described below may provide a finer resolution in touch angle and size calculations of the touch and may have lower jitter in the touch angle and size calculations as compared to calculating the touch orientation using the centroid position and perimeter distances.

The following embodiments describe using eigenvalues and eigenvectors to calculate the touch orientation. In mechanical engineering, a 3×3 matrix of products and moments of inertia (known as the inertia tensor) describes the distribution of mass within a 3-dimensional object. The inertia tensor's eigenvalues describe the principal moments of inertia (a maximum, a minimum, and a mid-range value such that all products of inertia are 0) and the corresponding eigenvectors describe the orientations of the principal axes, the axes about which the object can spin in free space without wobbling. The principal moments of inertia and principal axis have the following special properties.

The principal axis corresponding to the maximum principal moment of inertia is the axis about which the mass is concentrated furthest away (largest radius of gyration, the radius of the object if all mass were concentrated at that distance from the axis of rotation). Because of this characteristic, changing the rotational speed about this axis requires more effort than changing the rotational speed about either of the other principal axes.

The principal axis corresponding to the minimum principal moment of inertia is the axis about which the mass is concentrated closest (smallest radius of gyration). Because of this characteristic, changing the rotational speed about this axis requires less effort than changing the rotational speed about either of the other principal axes. The inertia tensor and radius of gyration concepts can apply to touch size (modeled as an ellipse) and touch orientation calculation as follows.

Instead of describing distribution of mass, the tensor describes distribution of touch signal. The touch signal data set is a set of "point masses." There are methods for calculating moments and products based on a composite of point mass contributions. Although the distribution of the signal over a surface (the touch panel area) reduces the inertia tensor size to 2×2, the characteristics of the eigenvectors and eigenvalues still hold. As noted above, the capacitive sense array 125 may have flat or non-flat surfaces. Additionally, the resulting eigenvalues based on the signal distribution can be converted to "radii of gyration" that describe touch contact ellipse semi-axis length along each principal axis, and the eigenvectors identify the orientation of the contact area with respect to the panel XY axis directions.

FIG. 11 illustrates the touch orientation calculator calculating eigenvalues and eigenvectors to determine a touch orientation according to one embodiment. In this embodiment, the same sensing, finger detection, and edge detection (touch outline) techniques described above may be used. For example, the touch orientation calculator 120 determines a centroid position of the touch and determines the outline of the touch. The touch orientation calculator 120 calculates two-dimensional moments of inertia and products of inertia of the touch data within the touch outline. The moments of inertia and products of inertia characterize a distribution of the touch data. The touch orientation calculator 120 calculates eigenvalues and eigenvectors of an inertia tensor of the moments of inertia and products of inertia. The touch orientation calculator 120 calculates the touch orientation with respect to a first axis from the eigenvector affiliated with the largest eigenvalue. In a further embodiment, the touch orientation calculator 120 can derive the minor axis length from the smallest eigenvalue, and the major axis length from the largest eigenvalue.

Given a set of processed capacitance signals $\{C_1, \ldots, C_n\}$ representing the contact patch and the set of xy coordinates $\{(x_1, y_1), \ldots, (x_n, y_n)\}$ corresponding to the sensor location at which each capacitance signal was obtained, the moments and products of inertia are calculated as sums of point signal contributions according to the following equations. In one embodiment, the touch orientation calculator 120 uses the following equations (8)-(10) to compute the touch orientation, major axis length, and minor axis length:

$$I_{xx} = \Sigma C_i (x_i - x_{cent})^2 \quad (8);$$

$$I_{yy} = \Sigma C_i (y_i - y_{cent})^2 \quad (9);$$

$$I_{xy} = I_{yx} = \Sigma C_i (x_i - x_{cent})(y_i - y_{cent}) \quad (10);$$

where
- $I_{xx}$ is the moment of inertia about the X axis
- $I_{yy}$ is the moment of inertia about the Y axis
- $I_{xy}$ is the product of inertia about the X axis due to signal distribution along the Y axis
- $I_{yx}$ is the product of inertia about the Y axis due to signal distribution along the X axis
- $C_i$ is the processed signal (typically capacitance difference counts) value
- $x_i$ is the X coordinate affiliated with the signal value
- $y_i$ is the Y coordinate affiliated with the signal value
- $x_{cent}$ is the X coordinate of the touch area centroid (calculated by other means)
- $y_{cent}$ is the Y coordinate of the touch area centroid (calculated by other means)
- n is the number of $\{C_i, x_i, y_i\}$ tuples included in the calculation.

The inertia tensor is represented below in equation (11):

$$I = \begin{bmatrix} I_{xx} & -I_{xy} \\ -I_{yx} & I_{yy} \end{bmatrix}, \quad (11)$$

where I is the inertia tensor, and $I_{xx}$, $I_{xy}$, $I_{yx}$, and $I_{yy}$ are defined above Solution of the eigenvector/eigenvalue equations for the inertia tensor I yields the following eigenvalues and eigenvectors as shown in equations (12)-(15).

$$\lambda_{major} = \frac{(I_{xx} + I_{yy}) + \sqrt{(I_{xx} - I_{yy})^2 + 4I_{xy}^2}}{2}; \quad (12)$$

$$\lambda_{minor} = \frac{(I_{xx} + I_{yy}) - \sqrt{(I_{xx} - I_{yy})^2 + 4I_{xy}^2}}{2}; \quad (13)$$

$$V_{major} \equiv \begin{bmatrix} x_{major} \\ y_{major} \end{bmatrix} = \begin{bmatrix} I_{xy} \\ I_{xx} - \lambda_{major} \end{bmatrix}; \quad (14)$$

and $$V_{minor} \equiv \begin{bmatrix} x_{minor} \\ y_{minor} \end{bmatrix} = \begin{bmatrix} \lambda_{major} - I_{xx} \\ I_{xy} \end{bmatrix}, \quad (15)$$

where $\lambda_{major}$ is the maximum eigenvalue (ie. the maximum moment of inertia), $\lambda_{minor}$ is the minimum eigenvalue (ie. the minimum moment of inertia), $V_{major}$ is the eigenvector corresponding to $\lambda_{major}$, $x_{major}$ and $y_{major}$ are the x axis and y axis components of $V_{major}$ respectively, $V_{minor}$ is the eigenvector corresponding to $\lambda_{minor}$, $x_{minor}$ and $y_{minor}$ are the x axis and y axis components of $V_{minor}$ respectively, and $I_{xx}$, $I_{xy}$, $I_{yx}$, and $I_{yy}$ are defined above.

The touch contact ellipse dimensions may be derived from the radius of gyration formula using the sum of the point signals to represent the total "signal mass," as represented in equations (16) and (17).

$$l_{major} = \sqrt{\frac{\lambda_{major}}{\sum_{i=1}^{n} C_i}}; \quad (16)$$

and $$l_{minor} = \sqrt{\frac{\lambda_{minor}}{\sum_{i=1}^{n} C_i}}, \quad (17)$$

where $l_{major}$ is the assumed touch contact ellipse semi-major axis length, and $l_{minor}$ is the assumed touch contact ellipse semi-minor axis length. $l_{major}$ and $l_{minor}$ may be multiplied by scale factors to improve their accuracy. $\lambda_{major}$, $\lambda_{minor}$, $C_i$, and n are defined above.

From these results, the size and orientation parameters can be calculated using the following formulas in equations (18)-(21):

$$AR = \frac{l_{major}}{l_{minor}}; \quad (18)$$

$$a = 2l_{major}; \quad (19)$$

$$b = 2l_{minor}; \quad (20)$$

and $$\theta = \arctan\left(\frac{y_{major}}{x_{major}}\right) = \arctan\left(\frac{y_{minor}}{x_{minor}}\right) \pm \frac{\pi}{2}, \quad (21)$$

where AR is the aspect ratio of the contact ellipse semi-major axis lengths, a is the contact ellipse major axis length, b is the constant ellipse minor axis length, θ is the angle between the x axis and the contact ellipse major axis (orientation). It should be noted that, due to the symmetry of an ellipse, there are multiple correct values of θ that are out of phase with each other by nπ radians (where n is any integer). Restriction of the range of θ can be applied to determine useful results for an application. Additionally, any filtering of θ could comprehend this concept in order to prevent erroneous filter output change as the orientation passes through a boundary of the range of θ.

In one embodiment, for consistency, each size and orientation calculation uses the same data set that the corresponding centroid calculation uses (e.g., uses 5×5 input data when 5×5 centroid is calculated, and use fat finger input data set when fat finger centroid is calculated). In a further embodiment, the products and the moments of inertia can be calculated simultaneously with centroid mass moment calculation to eliminate duplicate searches for the same data set boundaries (applicable to fat finger). However, the equations indicate that the centroid should be known first. To enable the simultaneous calculations above, the firmware can calculate moments and products of inertia relative to the X and Y axis origins and then use the following axis transfer equations to calculate the products and moments of inertia relative to the centroid coordinates after the centroid coordinates have been calculated, as shown in equations (22)-(240.

$$I_{xx} = \sum_{i=1}^{n} C_i x_i^2 - x_{cent}^2 \sum_{i=1}^{n} C_i; \quad (22)$$

$$I_{yy} = \sum_{i=1}^{n} C_i y_i^2 - y_{cent}^2 \sum_{i=1}^{n} C_i; \quad (23)$$

and $$I_{xy} = I_{yx} = \sum_{i=1}^{n} C_i x_i y_i - x_{cent} y_{cent} \sum_{i=1}^{n} C_i. \quad (24)$$

In some embodiments, edge correction may be used. Edge correction may assume a circular touch contact area, and generates false data. Therefore, a reliable calculation of touch contact size and orientation near an edge may not be obtainable. When edge correction is invoked, the resulting angle should be 0 and a single size value should be calculated. In one embodiment, the maximum X or Y coordinate value is $2^{14}$. The maximum signal value is $2^7$. Typical fat finger size is 50 elements. For conservative calculations, the firmware assumes that the maximum number of elements input to the calculation is $2^7$ elements. These sizes indicate that each moment of inertia could be up to 42 (14+14+7+7) bits and each product of inertia could be up to 43 (42+1 sign bit) bits long. The eigenvalue calculation requires a square of the product of inertia resulting in 84 bits. However, the resulting contact ellipse axis length values are 8 bits, so the 42/43/84 bits of resolution are not truly required to achieve satisfactory accuracy. Satisfactory results could probably be obtained with less than 32-bit resolution (possibly as low as 16-bit) for the moments and products of inertia, for example.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for calculating a touch orientation of a touch on a touch-sensing device, the method comprising:
   measuring, by a processing device, touch data of a conductive object on a sense array of the touch-sensing device;
   computing, by the processing device, a touch centroid of the touch from detected touch data;
   selecting four or more data points of a touch outline in the touch data;

calculating, by the processing device, distances between the touch centroid and each of the four or more selected data points of the touch outline;

determining a major axis length for a major axis of the touch using the largest distance between the touch centroid and each of the four or more selected data points of the touch outline;

after determining the major axis length of the touch, determining a width of a signal profile, the width of the signal profile being a projection of the major axis of the touch on a first axis corresponding to the touch surface of the sense array; and after determining the major axis length of the touch and the width of the signal profile, determining, by the processing device, a touch orientation of the touch with respect to the first axis by calculating an inverse trigonometric function using the width of the signal profile and the major axis length.

2. The method of claim 1, wherein calculating the inverse trigonometric function comprises calculating an arccosine of the width divided by the major axis length.

3. The method of claim 1, wherein the touch data comprises a two-dimensional (2D) image of the sense array.

4. The method of claim 1, wherein calculating the touch orientation of the touch further comprises calculating an aspect ratio of the touch outline, equal to the major axis length divided by the minor axis length, the aspect ratio computed based on the largest distance and a shortest distance between the touch centroid and each of the four or more selected data points of the touch outline.

5. The method of claim 4, wherein calculating the aspect ratio further comprises:
   calculating the major axis length by multiplying the largest distance by two; and
   calculating the minor axis length by multiplying the shortest distance by two.

6. The method of claim 4, wherein calculating the aspect ratio further comprises:
   calculating the major axis length by multiplying the largest distance by a first factor; and
   calculating the minor axis length by multiplying the shortest distance by a second factor.

7. The method of claim 4, wherein calculating the aspect ratio further comprises:
   calculating the major axis length of the aspect ratio using the largest distance; and
   calculating the minor axis length of the aspect ratio using the shortest distance between the touch centroid and each of the four or more selected data points of the touch outline.

8. The method of claim 7, wherein calculating the touch orientation further comprises:

determining a second width of the signal profile, which is a projection of the minor axis length on a second axis corresponding to the touch surface of the sense array; and determining whether the touch orientation is 0 degrees or 90 degrees using the first width of the touch in the first axis and the second width of the touch in the second axis, wherein the touch orientation is 0 degrees when the first width in the first axis is equal to the minor axis length, and wherein the touch orientation is 90 degrees when the second width in the second axis is equal to the major axis length.

9. An apparatus comprising:

a memory device; and a processing device coupled to the memory device, wherein the processing device is configured to detect a touch from touch data measured on a sense array of a touch sensing device, and wherein the processing device is configured to calculate a touch centroid position of the touch from the touch data, select four or more data points of a touch outline in the touch data, calculate distances between the touch centroid position and each of the four or more data points of the touch outline, and determine a major axis length for a major axis of the touch using the largest distance between the touch centroid position and each of the four or more selected data points of the touch outline, after determining the major axis length of the touch, determine a width of a signal profile of the touch, the width being a projection of the major axis on a first axis corresponding to the touch surface of the sense array, and after determining the major axis length of the touch and the width of the signal profile, determine, by the processing device, a touch orientation of the touch with respect to the first axis by calculating an inverse trigonometric function using the width of the signal profile and the major axis length.

10. The apparatus of claim 9, wherein the processing device is configured to calculate the touch orientation by calculating an arccosine of the width divided by the major axis length.

11. The apparatus of claim 9, wherein the processing device is further configured to calculate the touch orientation by calculating an aspect ratio of the touch outline, equal to the major axis length divided by the minor axis length, the aspect ratio computed based on the largest distance and a shortest distance between the touch centroid position and each of the four or more selected data points of the touch outline.

* * * * *